United States Patent [19]

West

[11] Patent Number: 4,474,204

[45] Date of Patent: Oct. 2, 1984

[54] DELIVERY AND METERING DEVICE CONTROL SYSTEM

[75] Inventor: Joe E. West, Coppell, Tex.

[73] Assignee: The Western Company of North America, Fort Worth, Tex.

[21] Appl. No.: 516,379

[22] Filed: Jul. 22, 1983

[51] Int. Cl.³ .............................................. G05D 11/13
[52] U.S. Cl. ........................................ 137/88; 137/91; 417/2; 417/36
[58] Field of Search ...................... 137/88, 91, 101.25; 417/2, 36, 38

[56] References Cited

U.S. PATENT DOCUMENTS 3,161,203 12/1964 Hathorn ............................. 137/91 X
4,265,262 5/1981 Hotine ............................... 417/36 X
4,327,759 5/1982 Millis ............................... 137/91 X Primary Examiner—Robert G. Nilson
Attorney, Agent, or Firm—Richards, Harris & Medlock

[57] ABSTRACT

A control system (10) is provided for maintaining a constant fluid level in a mixing container of a delivery and metering device. Structure (12) is provided for monitoring the fluid level in the mixing container and for generating a level signal (14) representing the fluid level present in the mixing container. Structure (18) is further provided for establishing a desired amount of fluid entering the mixing container and for generating a first control signal (20). Structure (22) is provided for establishing a desired amount of fluid discharged from the mixing container and for generating a second control signal (24). Measuring devices (30, 34) are utilized for measuring the amount of fluid discharged from the mixing container and for generating a discharge signal (36) representing the amount of fluid discharged from the mixing container. Circuitry (16) is provided for receiving the control signals (20, 24) and the level signal (14) for generating pump signals (40, 42) applied to inlet and discharge port pumps in response to the discharge signal (36).

6 Claims, 2 Drawing Figures

DELIVERY AND METERING DEVICE CONTROL SYSTEM

TECHNICAL FIELD

This invention relates to control systems, and more particularly to a servo control system for a delivery and metering device for granulated and powdered materials.

BACKGROUND ART

Many industrial applications require the delivery of large quantities of sand or other granulated or powdered materials in carefully measured quantities. One of the most demanding applications of such a delivery system is the preparation of fracturing fluid commonly used in oil well applications. Sand is the principal ingredient of fracturing fluids and oil well applications require a high volume of fracturing fluids to be continuously pumped into the borehole at high pressures. Very large and metered quantities of sand must be continually delivered to mixing facilities during fracturing applications. Further, the use of fracturing fluids demands careful control of tolerances and density and other parameters that are a function of the sand content.

Delivery and metering devices for fracturing fluid applications also require the monitoring of fracturing fluids in the process of mixing these fluids with the granulated material. The fracturing fluid may include, for example, water, diesel fuel and kerosine. It is desirable to continuously monitor the fracturing fluid level present in the delivery and metering device to ensure that a sufficient amount of fluid is present for the mixing operation. Additionally, it is desired to monitor the fluid level to prevent such fluids from overflowing the delivery and metering device when fluids are not required in the mixing process.

A need has developed for a control system for a delivery and metering device which will ensure the mixing of fracturing fluids having substantially uniform and repeatable characteristics in density and fluid content.

DISCLOSURE OF THE INVENTION

In accordance with the present invention, a control system is provided for a delivery and metering device which substantially eliminates the problems heretofore associated with such devices for the mixing of fracturing fluids.

In accordance with one aspect of the present invention, a control system is provided for maintaining a constant fluid level in a mixing container of a delivery and metering device. The delivery and metering device includes a mixing container having an inlet port and a discharge port. Each of these ports have an associated pump for controlling the amount of fluid passing through the port. Structure is provided for monitoring the fluid level in the mixing container and for generating a level signal representing the fluid level present in the mixing container. Structure is further provided for establishing a desired amount of fluid entering the mixing container and for generating a first control signal. Structure is provided for establishing a desired amount of fluid discharged from the mixing container and for generating a second control signal. Measuring devices are utilized for measuring the amount of fluid discharged from the mixing container and for generating a discharge signal representing the amount of fluid discharged from the mixing container. Circuitry is provided for receiving the control signals and the level signal for generating pump signals applied to the inlet and discharge port pumps in response to the discharge signal to thereby control the inlet and discharge fluid rates, such that the fluid level is maintained constant in the mixing container.

In accordance with another aspect of the present invention, a density control system is provided for use in a delivery and metering device wherein a mixture of granulated material and fluid flows through the delivery system. The delivery system has an inlet port and an outlet port and includes pumps for controlling the amount of granulated materials passing through the system. The control system includes structure for selecting a desired output density of the granulated materials. Structure is further provided for metering the actual output density of the granulated material from the delivery system. Circuitry is provided for comparing the actual output density to the desired output density and for generating an error signal. Structure is provided for selecting a predetermined amount of granulated material input to the delivery system and for generating a signal representing the selected amount of granulated material input to the delivery system. Structure is provided for measuring the actual amount of fluid input to the delivery system and for generating a signal representing the actual amount of fluid input to the delivery system. Circuitry is provided for receiving the error signal, the signal representing the amount of granulated material input to the delivery system and the signal representing the actual amount of fluid input to the delivery system, for generating a control signal. The control signal is applied to the delivery pumps for increasing or decreasing the amount of granulated material passing through the system to thereby achieve the desired output density of the granulated material.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION

The present control system is useful in a delivery and metering device for granulated and powdered materials. Such a device has application in the mixing of fracturing fluids for oil well use. The present control system is illustrated throughout this Description as a control system for use with a device for delivering and metering sand for making fracturing fluid. It being understood that the present control system can be utilized with various types of delivery and metering devices for controlling fluid and density levels of fluids. Such as sand delivery and metering device for mixing fracturing fluids is described in copending U.S. patent application Ser. No. 516,378, filed on July 22, 1983 and entitled "Delivery and Metering Device for Granulated and Powdered Materials".

Figure 1:
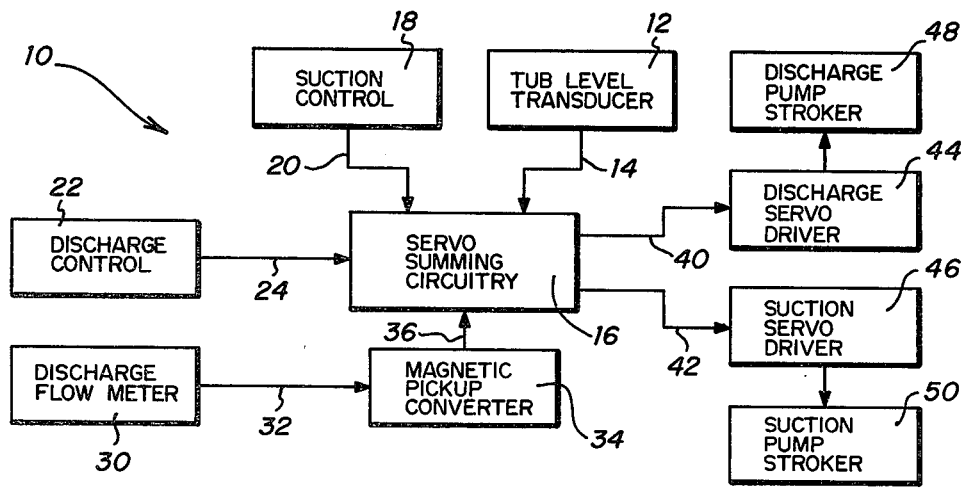
FIG. 1 is a block diagram of the present control system illustrating the fluid control aspect of the present invention.

Referring now to FIG. 1, the present fluid control system is illustrated in block diagram form and is referred to generally by the numeral 10. The present control system 10 utilizes a tub level transducer 12 associated with a mixing tub (not shown) of the delivery and metering device. The mixing tub receives the fracturing fluid such as, for example, water, which then is mixed in the delivery and metering device with granulated or powdered materials such as, for example, sand. It is desired that a predetermined and constant level of fluid be maintained in the tub for use by the delivery metering device. Tub level transducer 12 may comprise, for example, an automatic leveling device such as a bubble tube. Tub level transducer 12 generates a signal via signal line 14 which represents the fluid level in the tub. The output of tub level transducer 12 is applied to servo summing circuitry 16.

Also associated with the tub of the delivery and metering device are inlet and discharge ports for receiving and discharging the fluid passing through the tub. Associated with each port is a pump for controlling the amount of fluid passing through the respective port. The amount of fluid flowing into the tub is initially controlled by the system operator utilizing suction control 18. Suction control 18 establishes the initial amount of fluid entering the tub and generates a signal via signal line 20 which represents the amount of fluid entering the tub. The output of suction control 18 is applied to servo summing circuitry 16. In a similar manner, the operator selects the amount of fluid desired to be discharged from the tub utilizing discharge control 22. Discharge control 22 generates a signal via signal line 24 which is applied to servo summing circuitry 16 which represents the amount of desired fluid to be discharged from the tub.

Associated with the discharge port of the tub is a discharge flow meter 30. The discharge flow meter 30 monitors the amount of fluid being discharged from the discharge port of the tub. The output of discharge flow meter 30 is applied via signal line 32 to a magnetic pick up converter 34 which generates an electrical signal via signal line 36 to servo summing circuitry 16 representing the actual discharge rate of fluid flowing from the tub.

Servo summing circuitry 16 includes comparator circuitry, well known to those skilled in the art, for receiving the outputs of tub level transducer 12 and suction control 18 for comparing the actual tub level (signal via signal line 14) with the desired tub level (signal via signal line 20) for generating signals via signal lines 40 and 42 which are applied to a discharge servo driver 44 and a suction servo driver 46, respectively. The output of discharge servo driver 44 is applied to a discharge pump stroker 48. The output of suction servo driver 46 is applied to suction pump stroker 50. The signals generated via signal lines 40 and 42 thereby increase or decrease the speed of the pumps associated with the discharge and inlet port of the tub to thereby adjust the amount of fluid entering or leaving the tub to thereby maintain the tub level constant.

Servo summing circuitry 16 further monitors the output of the discharge flow meter 30 in the event of a rapid increase or decrease in the discharge flow rate. Using standard comparators, servo summing circuitry 16 will generate a signal via signal line 42 to suction servo driver 46 should the amount of fluid being discharged from the tub rapidly increase. Similarly, if the amount of fluid being discharged and monitored by discharge flow meter 30 rapidly decreases, servo summing circuitry 16 will generate a signal via signal line 42 to suction servo driver 46 to decrease the speed of suction pump stroker 50 and thereby decrease the amount of fluid flowing into the tub.

It therefore can be seen that the operator, through suction control 18 and discharge control 22, establishes a nominal fluid level in the tub. Through the use of discharge flow meter 30 and tub level transducer 12, the nominal level is maintained. In the event that the operator wishes to increase the discharge flow rate or if the system develops a line blockage or a valve closure such that discharge from the tub is inhibited, discharge flow meter 30 generates a control signal to servo summing circuitry 16 which in turn will either increase or decrease the speed of suction pump stroker 50 to compensate for the then existing condition.

Figure 2:
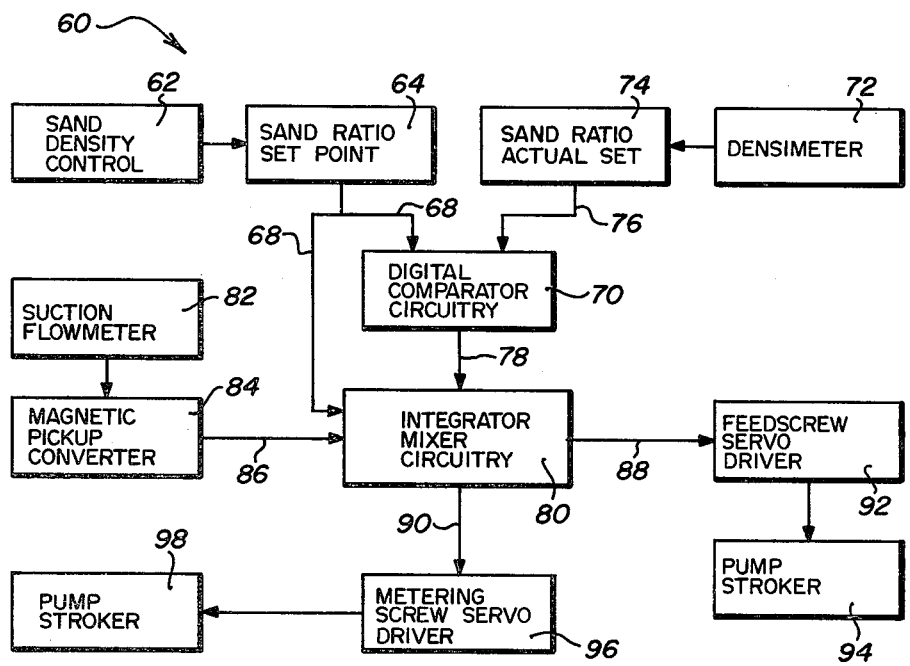
FIG. 2 is a block diagam of an additional aspect of the present invention illustrating the granulated material rate control system of the present invention.

Referring now to FIG. 2, a further aspect of the present control system is illustrated, and is generally identified by the numeral 60. Control system 60 is utilized for establishing the rate of granulated material such as, for example, sand or chemical fracturing fluids in a device for mixing fracturing fluids. As used herein, the term "granulated material" includes sand as well as fracturing fluids. Control system 60 includes a sand density control 62 through which the operator of system 60 selects the desired density of the sand to be output from the delivery and metering device. The output of sand density control 62 is applied to a sand ratio set point 64 which generates a signal representing the desired output density of the sand via signal line 68 to digital comparator circuitry 70.

The actual output density of the sand output from the delivery and metering device is measured utilizing a densimeter 72 whose output is applied to a sand ratio actual set point 74 which generates a signal via signal line 76 to digital comparator circuitry 70. The output of sand ratio actual set point 74 represents the actual density of the sand being discharged from the delivery and metering device.

Digital comparator circuitry 70 includes standard logic comparators for comparing the actual sand ratio measured by densimeter 72 to the desired sand ratio set point and generates an error signal via signal line 78 representing the difference between the actual and desired sand ratio. The output of digital comparator circuitry 70 is applied via signal line 78 to integrator mixer circuitry 80.

The amount of fluid entering the delivery and metering device is tracking proportionally by a suction flow meter 82 whose output is applied to a magnetic pick up converter 84 for generating a signal via signal line 86 to integrator mixer circuitry 80. The output of magnetic pick up converter 84 represents the amount of water being tracked for the sand metering system. The output of sand ratio set point 64, via signal line 68, is also applied to integrator mixer circuitry 80. Integrator mixer circuitry 80 functions to generate a control signal via signal line 88 and signal line 90 to increase or decrease the amount of sand being delivered to the delivery and metering system to maintain the output density constant as initially established by the operator. The output of integrator mixer circuitry 80 via signal line 88 is applied to a feedscrew servo driver 92 for driving a pump stroker 94. The output of integrator mixer circuitry 80 via signal line 90 is applied to a metering screw servo driver 96 which drives a pump stroker 98. The speeds of pump strokers 94 and 98 in turn control pumps for increasing or decreasing the amount of sand being delivered to the delivery and metering device.

It therefore can be seen that the present control system 60 functions to compensate for variations in the output density of the sand from a predetermined selected density, by controlling the input flow rate of the sand to the delivery and metering system. The actual density is measured using a densimeter which monitors the output density of the sand from the delivery and metering system.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a delivery and metering device wherein fluids are delivered to a mixing container through an inlet port and discharged from the mixing container through a discharge port, each of the ports having an associated pump for controlling the amount of fluid passing through the port, a control system for maintaining a constant fluid level in the mixing container comprising:

means for monitoring the fluid level in the mixing container and for generating a level signal representing the fluid level present in the mixing container;

means for establishing a desired amount of fluid entering the mixing container and for generating a first control signal;

means for establishing a desired amount of fluid discharged from the mixing container and for generating a second control signal;

means for measuring the amount of fluid discharged from the mixing container and for generating a discharge signal representing the amount of fluid discharged from the mixing container; and circuit means for receiving said control signals and said level signal for generating pump signals applied to the inlet and discharge pumps associated with the inlet and discharge ports in response to said discharge signal to thereby control the inlet and discharge fluid rate, such that the fluid level is maintained constant in the mixing container.

2. The control system of claim 1 wherein said circuit means generates said pump signal to the inlet pump for increasing the amount of fluid entering the mixing container in response to said measuring means measuring an increase in the amount of fluid being discharged.

3. The control system of claim 1 wherein said circuit means generates said pump signal to the inlet pump for decreasing the amount of fluid entering the mixing container in response to said measuring means measuring a decrease in the amount of fluid being discharged.

4. The control system of claim 1 wherein said circuit means generates said pump signal to the output pump for increasing the amount of fluid discharged from the mixing container in response to said first control signal representing an increase in the amount of fluid entering the mixing container.

5. The control system of claim 1 and further including:

means for monitoring the density of the fluid discharged from the discharge port.

6. In a delivery and metering device wherein a mixture of granulated material and fluid flows through a delivery system having an inlet port and an outlet port, the delivery system including delivery pumps for controlling the amount of granulated materials passing through the delivery system, a control system for maintaining a desired density of material flowing through the delivery system:

means for selecting a desired output density of the granulated material from the delivery system;

means for metering the actual output density of the granulated material from the delivery system;

comparator means for comparing the actual output density to the desired output density and for generating an error signal;

means for selecting a predetermined amount of granulated material input to the delivery system and for generating a signal representing the selected amount of granulated material input to the delivery system;

means for measuring the actual amount of fluid input to the delivery system and for generating a signal representing the actual amount of fluid input to the delivery system; and circuit means for receiving said error signal, said signal representing the amount of granulated material input to the delivery system and said signal representing the actual amount of fluid input to the delivery system for generating a control signal for application to the delivery pumps for increasing or decreasing the amount of granulated material passing through the system to thereby achieve the desired output density of the granulated material based upon the volume of the fluid input to the delivery system.

* * * * *